US005497092A

United States Patent [19]
Kaszanics

[11] Patent Number: 5,497,092
[45] Date of Patent: Mar. 5, 1996

[54] APPARATUS FOR DETECTING AND DISPLAYING ENGINE SPEED

[76] Inventor: Arthur J. Kaszanics, 7340 Wren Ave., Gilroy, Calif. 95020

[21] Appl. No.: 191,167

[22] Filed: Feb. 3, 1994

[51] Int. Cl.⁶ .................................................. F02P 17/00
[52] U.S. Cl. .......................................... 324/402; 324/390
[58] Field of Search .................................... 324/175, 168, 324/169, 170, 126, 128, 95, 109, 402, 391, 392, 380, 390

[56] References Cited

U.S. PATENT DOCUMENTS

| | | | |
|---|---|---|---|
| 3,548,300 | 12/1970 | Nolting | 324/392 |
| 3,601,773 | 8/1971 | Frieling et al. | |
| 3,811,089 | 5/1974 | Strzelewicz | |
| 3,886,450 | 5/1975 | Trussell et al. | |
| 3,942,113 | 3/1976 | Wilson | 324/402 |
| 3,963,987 | 6/1976 | Rivere | |
| 4,101,859 | 7/1978 | Reeves et al. | |
| 4,251,774 | 2/1981 | Knödler | 324/392 |
| 4,687,991 | 8/1987 | Kruncos | 324/169 |
| 5,091,695 | 2/1992 | Shaland | |

OTHER PUBLICATIONS

Electronic Design, pp. 52–53, vol. 4, No. 6, Mar. 15, 1956, Keithly Instruments, Inc.

Primary Examiner—Sandra L. O'Shea
Assistant Examiner—Roger Phillips
Attorney, Agent, or Firm—Thomas R. Lampe

[57] ABSTRACT

Apparatus for detecting and displaying the revolution speed of an internal combustion engine having an electrical distribution system including at least one spark plug includes a hand held housing having a digital display. An antenna is connected to the housing which is for placement adjacent to the spark cable. A pulse to direct digital interphase circuit is in the housing and counts the electrical energy pulses received by the antenna from the spark cable within a predetermined time frame to determine electrical pulse frequency and to convert the determined electrical pulse frequency into internal combustion engine revolution speed and to display the internal combustion engine revolution speed on the digital display.

15 Claims, 4 Drawing Sheets

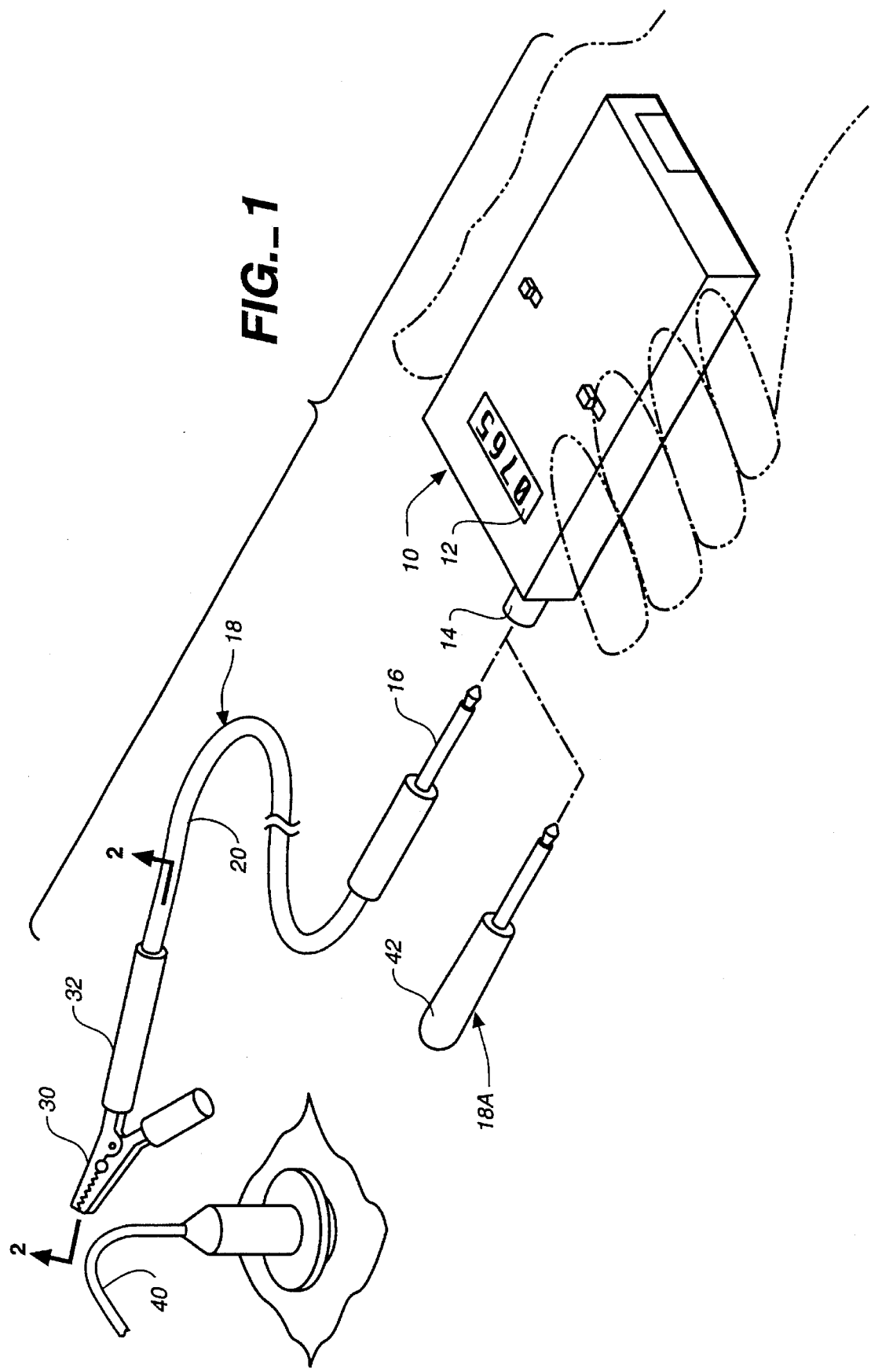

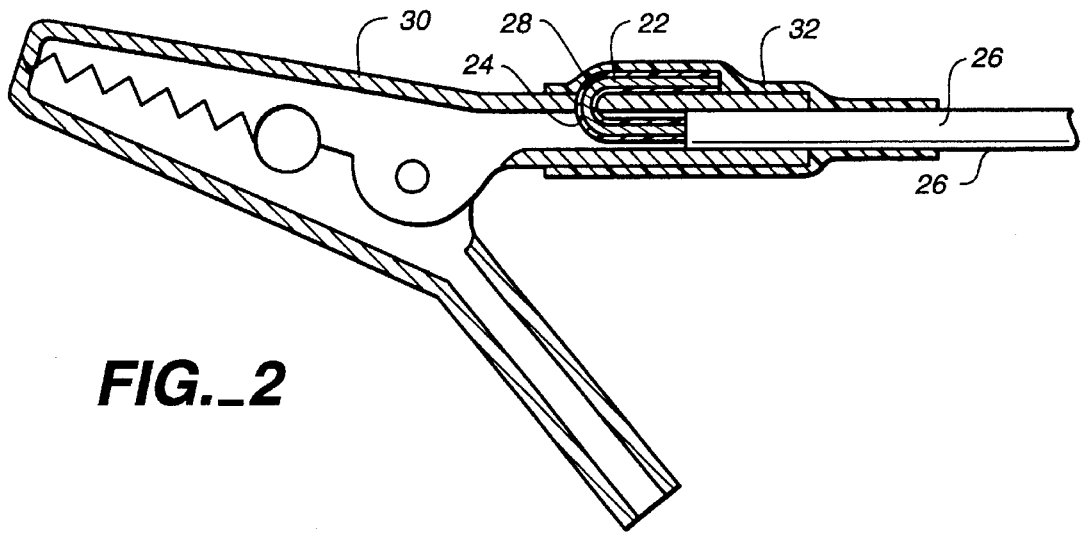
FIG._2
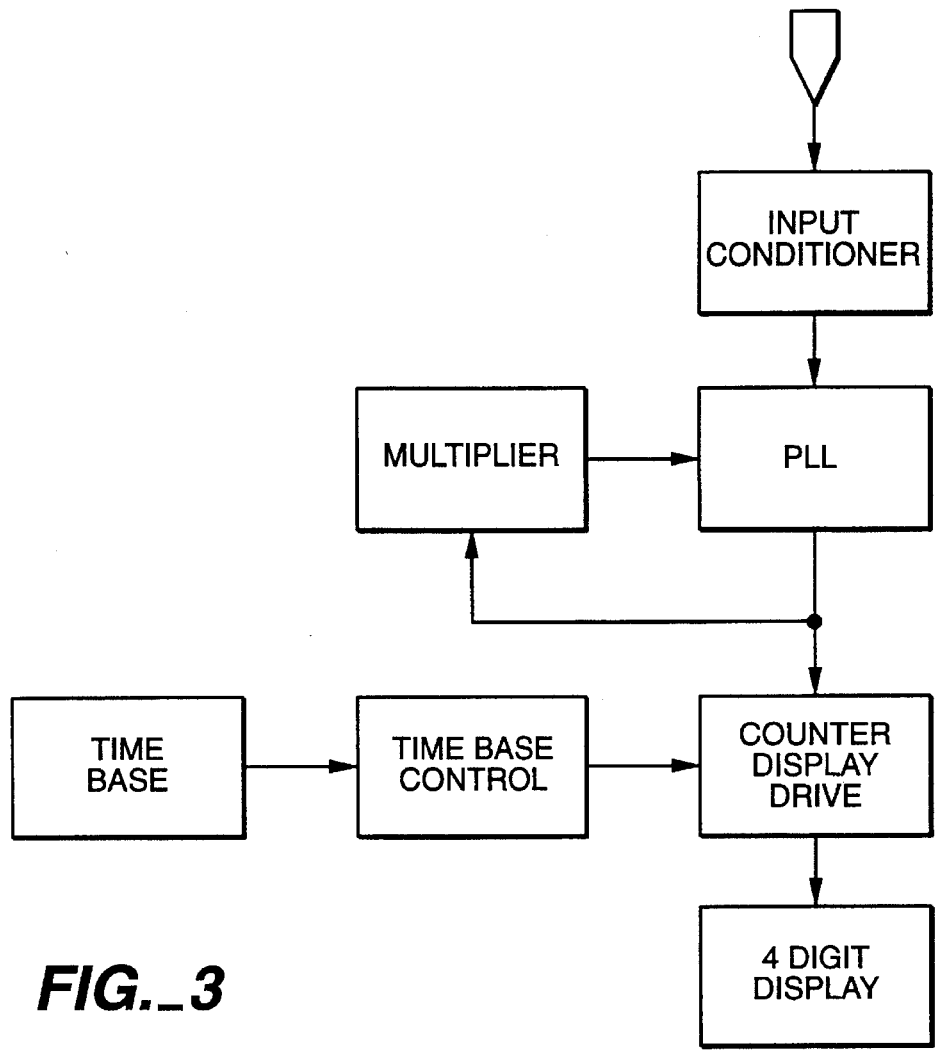
FIG._3

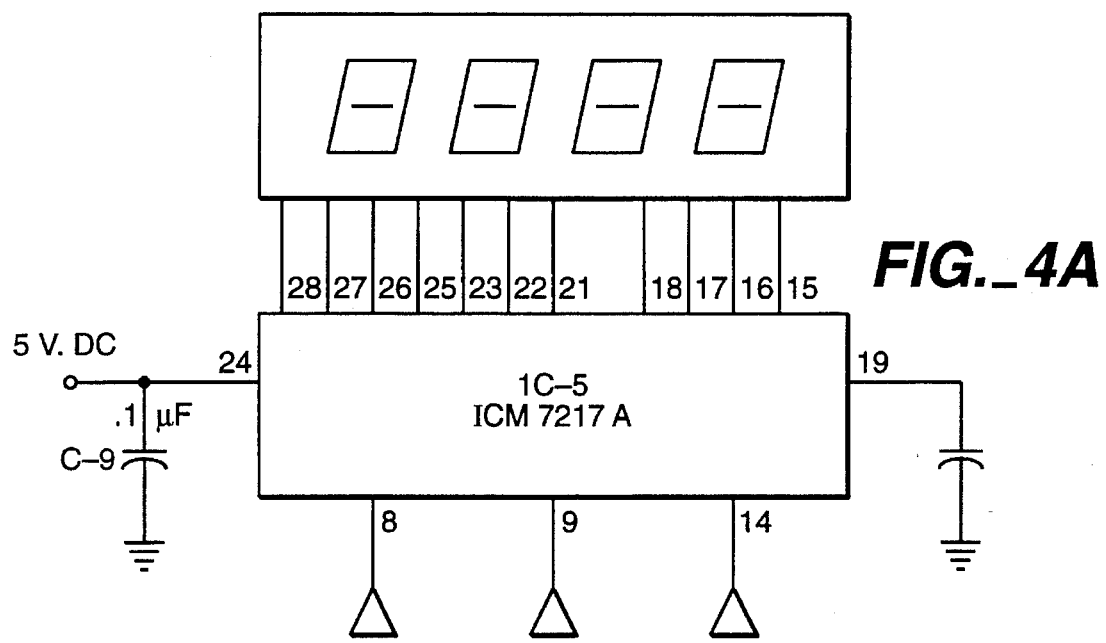
FIG._4A
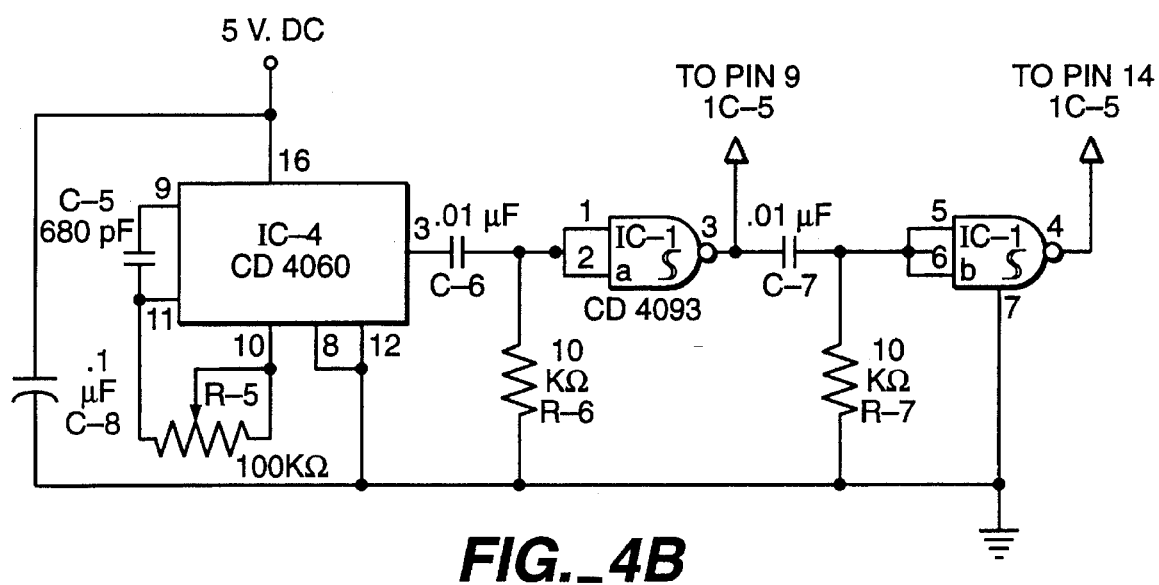
FIG._4B
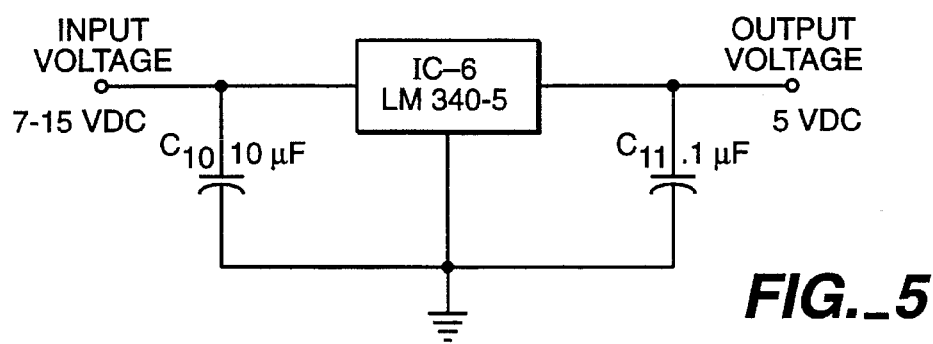
FIG._5

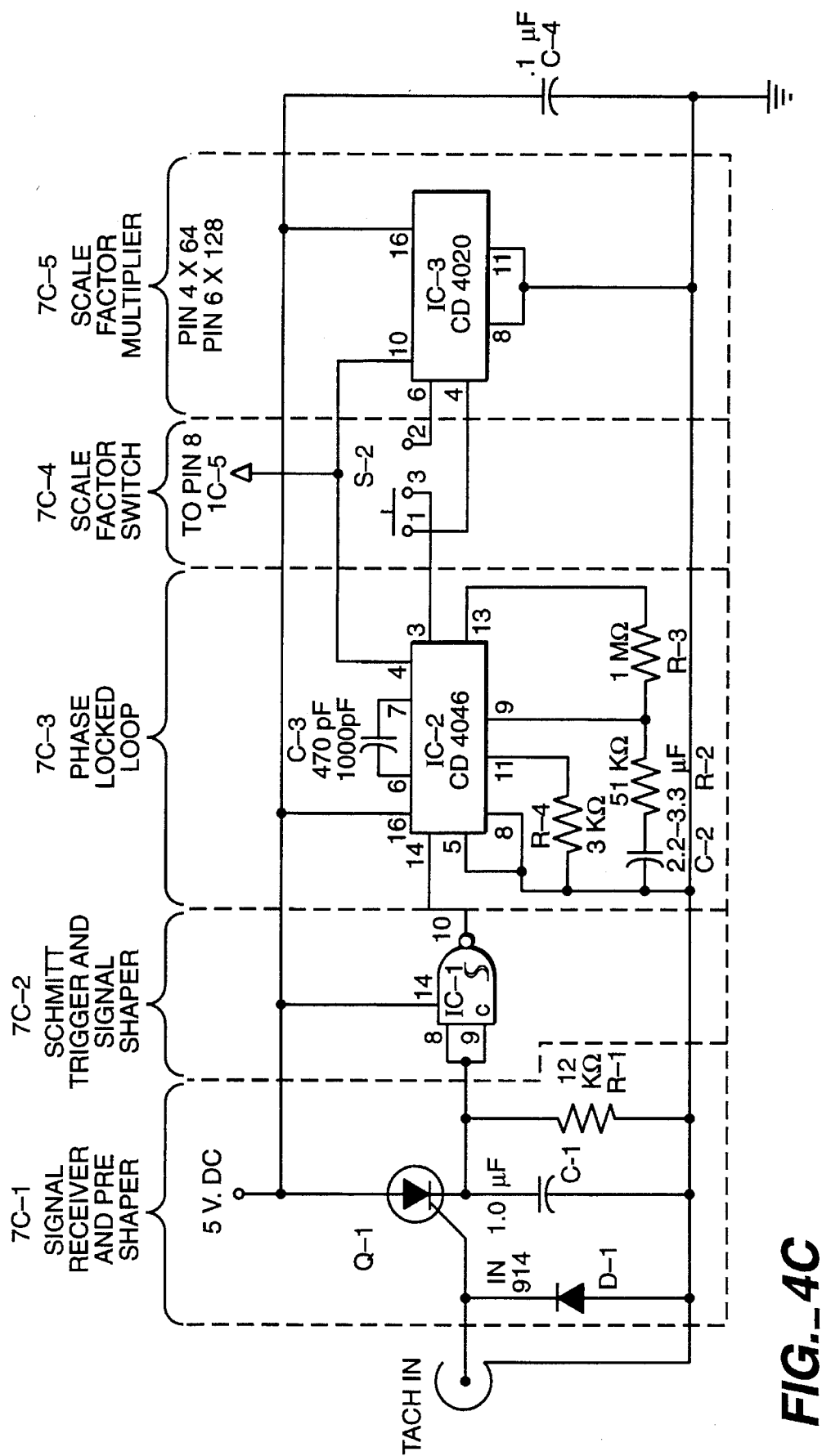
FIG._4C

APPARATUS FOR DETECTING AND DISPLAYING ENGINE SPEED

TECHNICAL FIELD

This invention relates to apparatus in the nature of a hand held tachometer utilized for detecting and displaying the revolution speed of an internal combustion engine having an electrical distribution system including at least one spark cable.

BACKGROUND ART

It is often helpful to determine the engine speed of internal combustion engines. Tachometers have been available for such purpose, such devices most commonly being employed to determine the speed of automobile engines; however, such devices can also be utilized to determine operational characteristics of such devices as powered lawn motors, portable RV generators, chain saws and the like.

Failure of internal combustion engines to operate properly can have harmful and undesirable consequences, not the least of which is the waste to gasoline, diesel, natural gas or other fossil fuels which occurs when internal combustion engines operate at less than peak performance. Furthermore, inefficient internal combustion engine operation can and does result in release of undue amounts of pollutants into the environment.

Hand held tachometers have been available in the marketplace for some time, but such devices are generally characterized by their bulk and lack of user friendliness. Most tachometers have been designed for use by professionals and on conventional ignition systems. This creates problems with regard to most new and modern electronic and computerized ignition systems. Improper hook-up or testing procedures can actually destroy a computerized ignition system and this can be very costly. For these reasons it is not feasible for many individuals to work on their own engines. This is aggravated by the fact that most small engines are designed without provisions for tachometer hook-up, or hook-up provisions are provided only for special tachometers.

The present invention relates generally to the field of inductive tachometers. While some relatively effective tachometers are known in the prior art, they are characterized by their relatively high expense, considerable bulk, and inability to be used in a variety of applications or in small or hard to reach places. Inductive pick-ups, by nature, have been fragile, prone to breakage, and expensive to repair.

U.S. Pat. No. 5,091,695, issued Feb. 25, 1992, discloses an electronic meter for determining engine speed in distributorless ignition system engines and conventional four stroke engines. The circuit disclosed in the patent was designed as a pulse to voltage converter to be employed with volt meters or multimeters on a millivolt scale.

The following patents are also believed to be representative of the state of the prior art: U.S. Pat. No. 3,601,773, issued Aug. 24, 1971, U.S. Pat. No. 3,811,089, issued May 14, 1974, U.S. Pat. No. 3,886,450, issued May 27, 1975, U.S. Pat. No. 3,963,987, issued Jun. 15, 1976, and U.S. Pat. No. 4,101,859, issued Jul. 18, 1978.

DISCLOSURE OF INVENTION

The apparatus of the present invention is for the purpose of detecting and displaying the revolution speed of an internal combustion engine having an electrical distribution system including at least one spark cable.

The apparatus is characterized by its relatively low cost and high degree of sensitivity, as well as by its ability to be hand held. The apparatus can be employed by virtually anyone wishing to perform his or her own engine tune-ups.

The apparatus includes a hand held housing having a digital display. An antenna is connected to the housing and projects therefrom, the antenna for placement adjacent to a spark cable of an internal combustion engine for receiving electromagnetic energy pulses radiating from the spark cable. The apparatus additionally includes pulse to direct digital counter interphase circuit means disposed in the housing in operative association with the antenna and with the digital display to count the electrical energy pulses received by the antenna from the spark cable within a predetermined time frame to determine electrical pulse frequency and to directly convert the determined electrical pulse frequency into internal combustion engine revolution speed and to display the internal combustion engine revolution speed on the digital display.

The pulse to direct digital counter interphase circuit means includes incoming signal shaper means and a phase locked loop in operative association with the incoming signal shaper means for multiplying the pulse frequency of the incoming signal.

The digital display comprises a four-digit LED display and the pulse to-direct digital counter interphase circuit means includes a four digit preselectable up/down counter integrated circuit.

Other features, advantages, and objects of the present invention will become apparent with reference to the following description and accompanying drawings.

BRIEF DESCRIPTION OF DRAWINGS

FIG. 1 is an exploded, perspective view illustrating components of the apparatus and a segment of an internal combustion ignition system including a spark wire;

FIG. 2 is an enlarged, cross-sectional, side view taken along the line 2—2 in FIG. 1;

FIG. 3 is a block diagram illustrating the cooperative relationship existing between components of the apparatus;

FIGS. 4A, 4B and 4C are electrical schematics of portions of the pulse to direct digital counter interphase circuit employed in the invention; and FIG. 5 is an electrical schematic of a power supply regulator utilized in the apparatus.

BEST MODE FOR CARRYING OUT THE INVENTION

Referring to FIG. 1, apparatus constructed in accordance with the teachings of the present invention includes a hand held housing 10 having a digital display 12. A socket 14 is located at an end of the housing, the socket being in the form of a conventional female connector element for releasably receiving a male connector element 16 which is affixed to an antenna 18.

Antenna 18 comprises an elongated, flexible, shielded cable 20 including a center wire 22 (FIG. 2). Wire 22 has a core of copper or other suitable material and a layer of insulation 24 thereabout.

With reference to both FIGS. 1 and 2, it will be observed that the cable is stripped of shielding 26 at the distal end of the center wire, i.e. the end thereof remote from connector element 16. The stripped distal end of the wire 16 is bent to form a bight and passes through an opening 28 of a conventional alligator clip 30. The distal end of the wire is secured in place relative to the alligator clip by a plastic tubular connector or overwrap 32 extending thereabout which is preferably heat shrunk into position. It is important to note that the center wire 22 is not in electrically conducted engagement with the clip 30.

The alligator clip is to be clamped onto a spark wire 40 comprising a portion of the electrical distribution system of an internal combustion engine. The purpose of the clip is to maintain the distal end of the center wire at a location spaced from and closely adjacent to the spark wire. For operation of the present apparatus it is not necessary that the distal end of the antenna wire be in actual engagement with the spark wire. For most operational environments it is usually suitable that the wire distal end be located about one and a half inches from the spark wire or less.

As an alternative to antenna 18, a form of antenna identified by reference number 18A may be utilized. Antenna 18A has a probe-like configuration including an enlarged head 42 of rubber, plastic or the like within which is embedded a wire distal end forming a bight of the type employed in antenna 18.

Regardless of the form of antenna utilized, the antenna functions to receive electromagnetic energy pulses radiating from the spark cable in an internal combustion engine. The high voltage produced by the collapsing magnetic field in the coil of the electrical system travels through the spark cable, which in turn radiates an electromagnetic energy field around the cable. This radiated field is picked up by the antenna.

The signal is conveyed from the antenna to a signal receiver employed in the circuitry of the disclosed invention and which is illustrated in FIG. 4C. The signal receiver circuit includes diode D-1, resistor R-1, capacitor C-1 and silicon controlled rectifier (SCR) Q-1. A table providing the specifications of these components as well as other components to be described in the circuitry is located at the end of this specification.

Diode D-1 controls or holds the incoming signal to positive rise, this signal triggering the SCR Q-1. Since SCR Q-1 is tied only to the positive voltage supply, SCR Q-1 fires a positive signal to capacitor C-1 and the capacitor will pass signals only within designed parameters.

This signal is then passed to resistor R-1. Since this resistor is utilized as a pull down resistor, the positive signal will pull resistor R-1 up to the positive rail and trigger integrated circuit IC-1.

IC-1 is a quad 2-input NAND Schmitt trigger. Internal hysteresis on the inputs makes this device very useful when dealing with noisy or slowly changing input levels. Both inputs of IC-1 are tied to ground through resistor R-1 and therefore the output of IC-1 is held high. When a positive signal triggers the input high, the output will be low. This process will be repeated for each positive triggered pulse to produce square wave pulses which are then fed to a phase locked loop (PLL) circuit.

The phased lock loop (PLL) circuit includes integrated circuit IC-2, integrated circuit IC-3, a single pole two position slide switch S-2, capacitor C-2, capacitor C-3, and resistors R-2, R-3 and R-4.

The PLL circuit and supporting components multiply the incoming signal by 128 times for a four cycle engine and 64 times for two cycle engines and C3I ignitions. These multiplication factors are necessary in order for the counter or digital display of the apparatus to display the correct RPM. Switch S-2 controls the multiplication factors. If switch S-2 is connected between IC-2 pin 3 and IC-3 pin 4, the multiplier factor is 64. If switch S-2 is connected between IC-2 pin 3 and IC-3 pin 4, then the multiplier factor is 128.

The PLL circuit feeds this signal to integrated circuit IC-5 shown in FIG. 4A. IC-5 is a four digit pre-setable up/down counter and has the ability to count to 9999. The circuits of IC-5 provide multiplexed seven segment LED (light emitting diode) display outputs and is able to directly drive a four digit LED display.

A timing circuit is shown in detail in FIG. 4B and includes integrated circuit IC-1a, integrated circuit IC-1b, integrated circuit IC-4, capacitors C-5, C-6 and C-7, and resistors R-4, R-5 and R-6.

IC-4 is connected in an RC oscillator mode to produce the time base for the counter. The timing signal is fed to capacitor C-6 which integrates the signal for IC-1a. IC-1a inputs are connected to ground or low with resistor R-5. When capacitor C-6 passes the high signal the input goes to ground or low to produce a correct signal for IC-5 to store the data it receives from the PLL circuit. This signal is also utilized to integrate IC-1b through capacitor C-7. IC-1b is identical to IC-1a. IC-1b produces a correct signal for IC-5 to reset and start a new count.

FIG. 5 illustrates in detail the power supply regulator of the present apparatus and its components: integrated circuit IC-6, and capacitors C-10 and C-11. The power supply per se can be of any suitable conventional design and thus requires no detailed disclosure.

Other components employed in the circuit of note are capacitors C-4, C-8 and C-9 which are used to decouple the transient spikes within the circuit and operatively associated PC board.

TABLE (Parts List):

| RESISTORS: | |
| --- | --- |
| R-1 | 12,000 Ohms |
| R-2 | 51,000 Ohms |
| R-3 | 1,000,000 Ohms |
| R-4 | 3,000 Ohms |
| R-5 | 100,000 Ohms 10 turn POT. |
| R-6 | 10,000 Ohms |
| R-7 | 10,000 Ohms |

All resistors are ¼ watt, 5% unless otherwise indicated.

| CAPACITORS: | |
| --- | --- |
| C-1 | 1.0 uF nonpolar |
| C-2 | 2.2–3.3 uF tantalum |
| C-3 | 470–1000 pF Mica |
| C-4 | 0.1 uF tantalum |
| C-5 | 680 pF Mica |
| C-6 | 0.01 uF disc |
| C-7 | 0.01 uF disc |
| C-8 | 0.1 uF tantalum |
| C-9 | 0.1 uF tantalum |
| C-10 | 10.0 UF tantalum |
| C-11 | 0.1 uF tantalum |
| SEMICONDUCTOR: | |
| Q-1 | SK3950 (ECG 5400) Silicon Controlled Rectifier |
| INTEGRATED CIRCUITS: | |
| IC-1 | CD 4093 NAND GATE SCHMITT TRIGGER |
| IC-2 | CD 4046 Micropower PLL |
| IC-3 | CD 4020 14 STAGE BINARY RIPPLE COUNTER |

| | |
|---|---|
| IC-4 | CD 4060 14 STAGE BINARY RIPPLE COUNTER |
| IC-5 | ICM 7217- 4 digit display programmable up/down counter |
| IC-6 | LM 340-5 5V VOLTAGE REGULATOR |

Furthermore, inefficient

I claim:

1. Apparatus for detecting and displaying the revolution speed of an internal combustion engine having an electrical distribution system including at least one spark cable, said apparatus comprising, in combination:

a hand held housing having a digital display;

an antenna connected to said housing and projecting therefrom, said antenna for placement adjacent to a spark cable of an internal combustion engine for receiving electromagnetic energy pulses radiating from said spark cable; and pulse to direct digital counter interphase circuit means disposed in said housing in operative association with said antenna and with said digital display to count the electrical energy pulses received by said antenna from said spark cable within a predetermined time frame to determine electrical pulse frequency and to directly convert the determined electrical pulse frequency into internal combustion engine revolution speed and to display said internal combustion engine revolution speed on said digital display, said pulse to direct digital counter interphase circuit means including incoming signal shaper means and a phase locked loop in operative association with said incoming signal shaper means for multiplying the pulse frequency of said incoming signal, and said pulse to direct digital counter interphase circuit means including switch means operatively associated with said phase locked loop to vary the multiplication factor for multiplying the pulse frequency of said incoming signal.

2. The apparatus according to claim 1 wherein said incoming signal shaper means includes a Schmitt trigger for shaping said incoming signal pulses into square unit pulses.

3. The apparatus according to claim 1 wherein said digital display comprises a four digit LED display and wherein said pulse to direct digital counter interphase circuit means includes a four digit preselectable up/down counter integrated circuit.

4. The apparatus according to claim 1 wherein said pulse to direct digital counter interphase circuit means includes a timing circuit establishing said predetermined time frame.

5. The apparatus according to claim 1 wherein said pulse to direct digital counter interphase circuit means includes a power supply regulator.

6. The apparatus according to claim 1 wherein said antenna comprises an elongated, flexible shielded cable having a center wire with a distal end, said flexible shielded cable being stripped of shielding at said center wire distal end.

7. Apparatus for detecting and displaying the revolution speed of an internal combustion engine having an electrical distribution system including at least one spark cable, said apparatus comprising, in combination:

a hand held housing having a digital display;

an antenna connected to said housing and projecting therefrom, said antenna for placement adjacent to a spark cable of an internal combustion engine for receiving electromagnetic energy pulses radiating from said spark cable; and pulse to direct digital counter interphase circuit means disposed in said housing in operative association with said antenna and with said digital display to count the electrical energy pulses received by said antenna from said spark cable within a predetermined time frame to determine electrical pulse frequency and to directly convert the determined electrical pulse frequency into internal combustion engine revolution speed and to display said internal combustion engine revolution speed on said digital display, said antenna comprising an elongated, flexible shielded cable having a center wire with a distal end, said flexible shielded cable being stripped of shielding at said center wire distal end.

8. The apparatus according to claim 7 wherein said pulse to direct digital counter interphase circuit means includes incoming signal shaper means and a phase locked loop in operative association with said incoming signal shaper means for multiplying the pulse frequency of said incoming signal.

9. The apparatus according to claim 8 wherein said pulse to direct digital counter interphase circuit means includes switch means operatively associated with said phase locked loop to vary the multiplication factor for multiplying the pulse frequency of said incoming signal.

10. The apparatus according to claim 7 wherein said antenna further comprises releasable securement means attached to said center wire distal end for releasably securing said center wire distal end to a spark wire of an internal combustion engine and maintaining said center wire distal end at a location spaced from and closely adjacent to said spark wire.

11. The apparatus according to claim 10 wherein said releasable securement means comprises a manually operable clip for clamping the spark wire and wherein said center wire has a bight formed therein at said distal end in engagement with said clip.

12. The apparatus according to claim 11 wherein said center wire is insulated from said clip by insulation surrounding said center wire at the location of engagement of said center wire with said clip.

13. The apparatus according to claim 12 wherein said clip comprises an alligator clip.

14. The apparatus according to claim 7 additionally comprising antenna connector means for releasable connecting said elongated, flexible shielded cable to said housing and to said pulse to direct digital counter interphase circuit means.

15. The apparatus according to claim 7 wherein said antenna is a relatively rigid antenna element releasably connected to said housing and having a probe-like configuration.

* * * * *